May 7, 1957 T. J. DOYLE 2,791,202
ANIMAL COLLAR HAVING A POCKET FOR INSECTICIDE
Filed Sept. 8, 1955
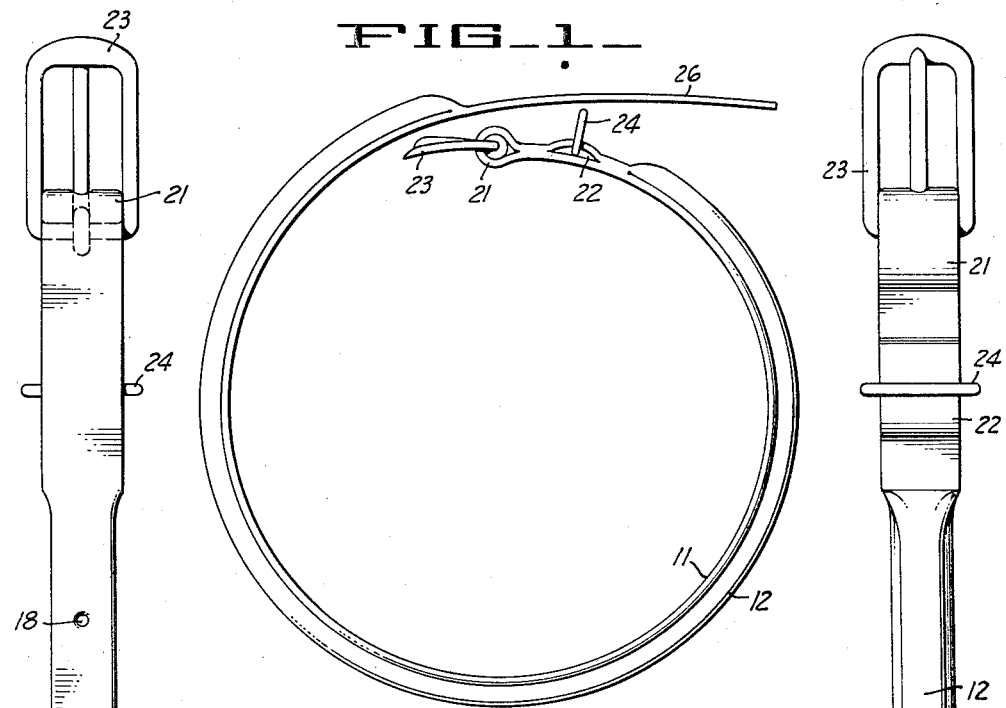
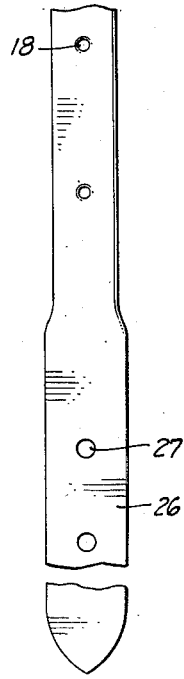
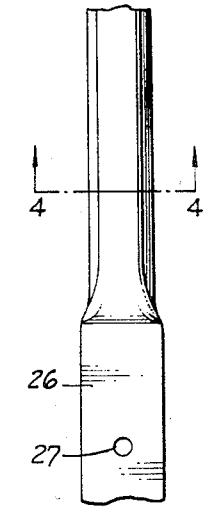
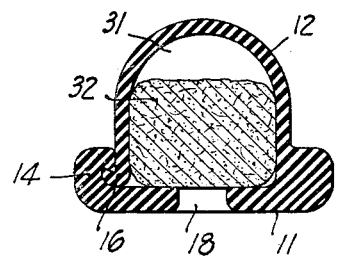
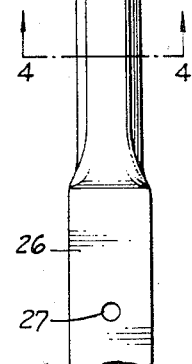
INVENTOR.
Thomas J. Doyle
BY
ATTORNEYS

United States Patent Office 2,791,202
Patented May 7, 1957

2,791,202
ANIMAL COLLAR HAVING A POCKET FOR INSECTICIDE

Thomas J. Doyle, Los Angeles, Calif.

Application September 8, 1955, Serial No. 533,135

3 Claims. (Cl. 119—106)

This invention relates generally to animal collars and more particularly to animal collars suitable for carrying insecticides, deodorants, and the like.

Conventional animal collars have been objectionable in that often they are unattractive and not very flexible. In addition, they are often not adapted for use with insecticides or deodorants because it is difficult or impossible to insert the insecticide or deodorant within the collar.

In general, it is an object of the present invention to provide an attractive animal collar of the above character which is hollow and flexible.

Another object of the invention is to provide an animal collar of the above character with an insecticide or deodorant core within it.

Another object of the invention is to provide an animal collar of the above character in which the insecticide or deodorant core can be readily inserted and removed.

A further object of the invention is to provide an animal collar of the above character in which novel means are provided for interlocking the tunnel portion of the collar containing the insecticide or deodorant core to the inner peripheral wall of the collar.

Other objects and advantages of the invention will appear from the following description taken in conjunction with the accompanying drawing.

Referring to the drawing:

Figure 1 is a side elevational view of my animal collar showing the ends ready to be buckled together.

Figure 2 is a bottom view of my animal collar in a rolled-out flat position.

Figure 3 is a top view of my animal collar shown in Figure 2.

Figure 4 is a cross-sectional view taken along the line 4—4 of Figure 3.

The embodiment of my animal collar shown in the drawing is in the form of a neck embracing member which consists of a length of resilient material having an inner peripheral wall 11 and an outer U-shaped or tunnel-shaped portion 12. One edge of the tunnel-shaped portion is integrally joined to one edge of the inner peripheral wall 11. The other edge of the inner peripheral wall is provided with a lip 14 which is adapted to retain a ridge 16 on the other edge of the tunnel-shaped member 12. When the ridge is retained within the lip 14 it is apparent that the tunnel-shaped portion 12 and the peripheral wall 11 form a hollow tubular member for a purpose hereinafter described.

The inner peripheral wall 11 is provided with a plurality of spaced ports or openings 18 for a purpose also hereinafter described.

One end of the flexible length of material is pressed flat and folded over to form a pair of loops 21 and 22 retaining a buckle 23 and a keeper 24. The other end of the length of flexible material is also pressed flat to provide a tongue portion 26 having openings 27 for engagement with the buckle 23.

The animal collar may be made from any suitable flexible material such as an elastomeric vinyl. If made of such a plastic material, the animal collar can be molded under heat and pressure. The folded over portion may be secured to the main body of the collar by application of such heat and pressure.

It is apparent from the foregoing that I have provided an attractive animal collar of simple and economical construction which may be used in this condition. However, if desired, the hollow space 31 formed between the outer tunnel-shaped portion and the inner peripheral wall 11 of the animal collar may be filled with a core containing suitable deodorant for deodorizing the animal or an insecticide which is offensive to fleas and other vermin. Any suitable material may be utilized however the material must contain a volatile constituent.

One means found to be satisfactory for retaining an insecticide or deodorant within the space 31 consists of a length of absorbent material 32 such as wool felt which has been impregnated with the deodorant or insecticide and then placed within the space 31. The volatiles given off by the insecticide or deodorant pass through the ports or openings 18 onto the neck of the animal.

The elongated strip of absorbent material 32 is easily insertable within the space 31 merely by lifting the ridge 16 of the tunnel portion 12 from the lip 14 and inserting the length of absorbent material within the space. The tunnel-shaped portion may then be pressed down against the inner peripheral wall 11 until the ridge 16 again engages the lip 14.

It is apparent from the foregoing that I have provided an attractive animal collar which can be utilized for applying deodorants and insecticides to animals.

Particularly novel means are utilized in the collar for permitting easy insertion and removal of the absorbent material containing the insecticides or deodorants.

I claim:

1. In an animal collar, a neck embracing member formed from a length of flexible material, the member comprising an inner peripheral wall portion and an outer U-shaped or tunnel-shaped wall portion having one edge integrally joined to one edge of the inner peripheral wall portion, and means integrally joined to said member for detachably securing the other edge of the U-shaped or tunnel-shaped portion to the other edge of the inner peripheral wall portion, and means associated with the member for maintaining the member in embracing form on the neck of the animal.

2. An animal collar as in claim 1 together with an insecticide or deodorant carrying material mounted within said U-shaped or tunnel-shaped wall portion, said carrier being adapted to be removed by detaching said other edge of said U-shaped or tunnel-shaped wall portion from said other edge of said inner peripheral wall portion.

3. In an animal collar, a neck embracing member formed from a length of flexible material, the member comprising an inner peripheral wall portion, an outer U-shaped or tunnel-shaped wall portion having one edge integrally joined to one side edge of the inner peripheral wall portion, a ridge on the other edge of the U-shaped or tunnel-shaped wall portion, and a lip formed on the other side edge of the inner peripheral wall portion, said lip being adapted to retain the adjacent ridge therein, the U-shaped or tunnel-shaped wall portion having an inner peripheral wall portion forming a space extending substantially the entire length of the collar, an insecticide or deodorant carrier mounted in said space and adapted to be removed from said space by detaching said ridge from said lip, and means associated with the member for maintaining the member in an embracing form on the neck of the animal.

References Cited in the file of this patent

UNITED STATES PATENTS

| | | |
|---|---|---|
| 2,219,569 | Vanderhoof | Oct. 29, 1940 |
| 2,349,713 | Finch | May 23, 1944 |
| 2,401,253 | Lamb | May 28, 1946 |

FOREIGN PATENTS

| | | |
|---|---|---|
| 200,224 | Germany | July 10, 1908 |